*Edward Warren's Imp'd HOE.*

4461

REISSUED JUL 4 1871

Witnesses.

Otto Lee Johnson, fecit.
Will F. Coles

Inventor.

Edward Warren.
by George Johnson.
his Attorney in fact.

UNITED STATES PATENT OFFICE.

EDWARD WARREN, OF CERESCO, MICHIGAN.

IMPROVEMENT IN HOES.

Specification forming part of Letters Patent No. 102,891, dated May 10, 1870; reissue No. 4,461, dated July 4, 1871.

*To all whom it may concern:*

Be it known that I, EDWARD WARREN, of Ceresco, in the county of Calhoun and State of Michigan, have invented certain Improvements in Hoes, of which the following is a correct specification:

My invention relates to the contour of the blade of the hoe combined with certain face-curves of a somewhat determinate character, both longitudinally and in cross-section, said contour furnishing, in addition to the main curvilinear blade for common use, two somewhat similarly-shaped shoulder-wing blades for the special use of displacing from the right or left weeds that are growing near the stem of the plants. The face curvatures employed in connection with the contour aforesaid are designed for the combined purpose of stiffening the blades, enlarging the extent of cutting-edge, and facilitating its penetration, producing a self-scouring effect, and thereby prevent clogging with weeds or wet earth; and, finally, to enable the operator to perform all the various operations cited without a fatiguing deviation from an erect position.

Figure 1:
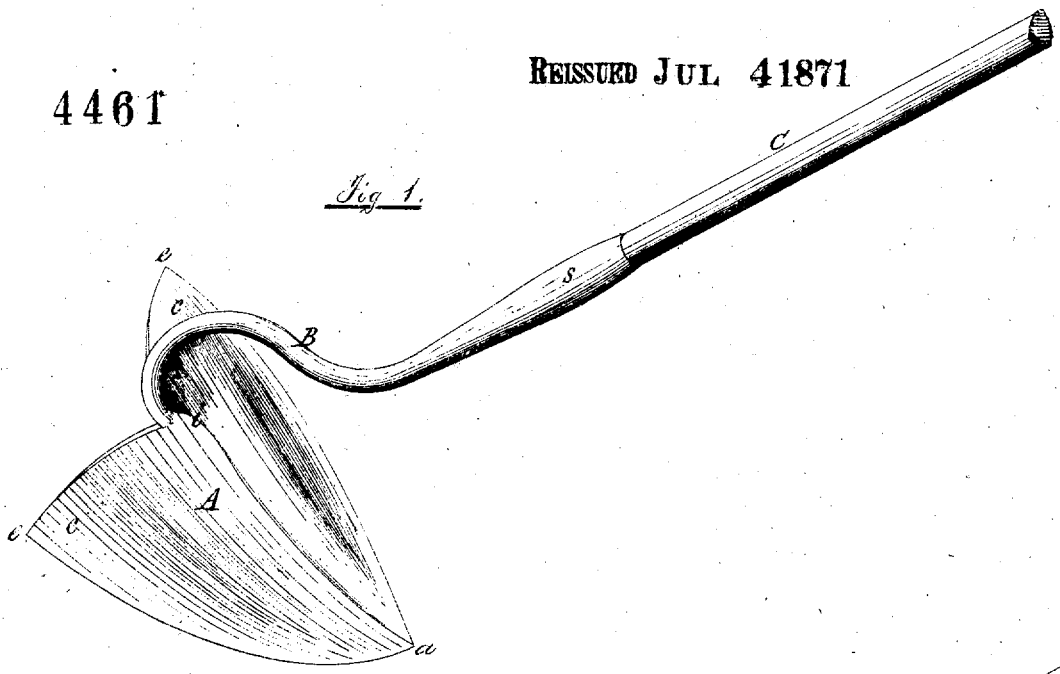
Figure 2:
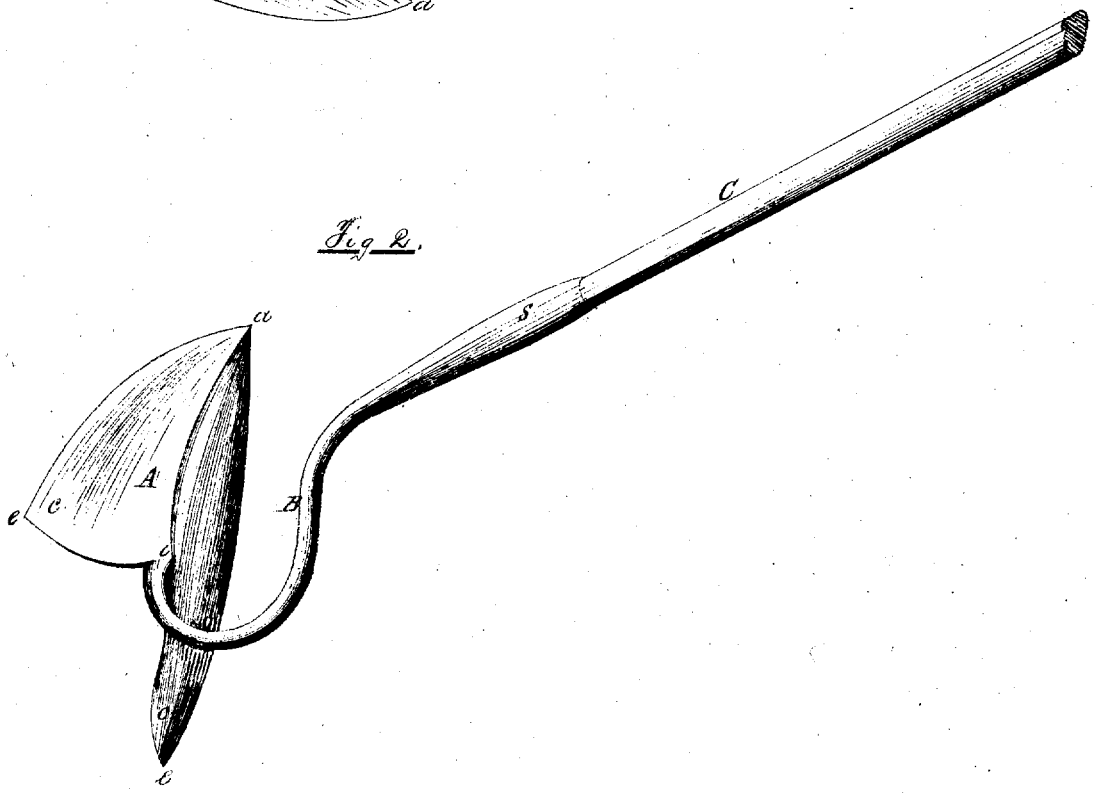

My invention is embodied in the annexed drawing in perspective, in which Figure 1 exhibits the hoe with the main blade in position for entering the ground, as in ordinary use. Fig. 2 exhibits the position of the hoe when one of its shoulder-blades is employed in weeding around the stems of growing plants.

The following is a full and accurate description of the construction of my improved hoe, and its operation:

A is the blade. B is the curved socketed shank, and C the wooden handle (broken off) inserted and secured, as usual, in the shank-socket *s*. The side edges of the blade are two convex converging curves, uniting below to form a central pointed tip, as shown at *a*. The top edge of the blade has a deep curvilinear indentation, as shown, so as to form a right and left wing shoulder projecting upward and outward from the central depression at *i*, so as to constitute projecting shoulder-wings, as at *c c*, terminating in pointed tips *e e*, substantially resembling the main central tip *a*. The shank is bent in a gooseneck form, as shown, and connected with the blade at *i* by welding, or in any other well-known suitable way, and its main curve should be so elevated above the blade as to prevent clogging, while it is desirable to so depress the reversed curve as to bring the handle in such line with the blade that when employed in detaching weeds from around plants with the wing-tips *e e* in the position shown in Fig. 2, the hoe will have no material tendency to turn either way when held loosely in the hands of the operator. The blade A is so set on the shank B as to form with the handle, when inserted, like all well-constructed hoes, the proper angle for entering the ground; and said blade, in addition to being longitudinally curved in a manner approximating the circle arc of oscillation, while being used as in the position shown in Fig. 1, is bent and curved laterally or crosswise in manner following: Each half-section of the blade, as divided by a line from *i* to *a*, is deflected backward in a lateral curve (the concavities being in front or facing the handle) in such manner as to leave a prominent ridge, either sharp or rounded, along such dividing line, said ridge being made by bending back the half-sections; and these deflected curves should be of such nature and extent that when the blade is held in working position, as in Fig. 2, those sections near the wing-tips *e* will stand vertical or nearly so.

My improved hoe may be constructed of any of the materials and by any of the known processes employed in the construction of such implements.

The converging edges of the main working-blade facilitate its insertion into compact ground. The pointed shoulder-wing tips *e e* are extremely safe, and useful for detaching weeds from around growing plants. The lateral deflected curves stiffen the blade against any tendency to buckle, even with a much lighter plate than is common, and the peculiar-shaped faces of the blade maintain themselves bright by the attrition of use. Neither wet earth nor weeds will readily adhere either to the central ridge or to the smooth deflected cross-curves, and when the wing-tips are used as and for the purpose shown by Fig. 2, the operator, while maintaining an upright position, can sink the tip-sections *e* vertically in the ground, and thus displace the weeds by a pushing or pulling action, as may be most convenient.

I claim as my invention—

A hoe having the edge of its blade A shaped in curves which converge together and form the pointed tips *e e* and *a*, when such blade, in addition to being curved longitudinally, is formed with a sharp central ridge, *r*, in the same direction, and each half-section is bent back, forming a concave surface. said ridge *r* extending in front from *i* to *a*, and the blade being constructed and hung, substantially as and for the purposes set forth.

EDWARD WARREN.

Witnesses:
C. H. Cook,
C. T. Cook.